United States Patent
Faramarzpour et al.

[15] 3,652,164
[45] Mar. 28, 1972

[54] RELATIVE BACK FOCUS MONITORING METHOD AND APPARATUS

[72] Inventors: Faramarz Faramarzpour, Jamaica Plain; Ernest W. Long, West Concord, both of Mass.

[73] Assignee: Polaroid Corporation, Cambridge, Mass.

[22] Filed: May 1, 1970

[21] Appl. No.: 33,612

[52] U.S. Cl..............................................356/125
[51] Int. Cl. ......................................................G01b 9/00
[58] Field of Search.................................356/125; 250/204

[56] References Cited

OTHER PUBLICATIONS

Potential App. For Focatron Idea, Dwin R. Craig Nov. 1961.

Primary Examiner—Ronald L. Wibert
Assistant Examiner—Conrad Clark
Attorney—Brown and Mikulka

[57] ABSTRACT

The subject invention generally provides a method and apparatus for determining the relative back focus of each of a plurality of lenticules or the like and, more particularly, provides for the determination of the relative back focus of each of a plurality of lenticules comprising a lenticular film which is disposed along one surface of a supporting web.

The relative back focus of each lenticule or the like may be generally defined as the distance from the focus of said lenticule or the like to a reference which, in the case of a web supported lenticular film, is the surface of the web opposite the lenticular film. Briefly, collimated light is passed through each of the lenticules and is focused by a moving microscopic objective which is positioned outward of the surface of the web opposite the lenticular film. The objective is moved toward and away from the web so as to vary the focal plane of the image received from one of the lenticules.

When the image of said one lenticule is focused at a predetermined point, it is detected by a photo-detector which provides an electrical output pulse indicative thereof. Means are provided for determining the position of the microscopic objective at the time of said pulse.

A source of light of a wavelength different from that of said collimated light is provided and transmits light, through said microscopic objective to the non-lenticulated side of said web such that it is reflected therefrom. This reflected light is brought to focus remote from said web by said microscopic objective. The microscopic objective is moved with respect to the web until said reflected light is brought to said same predetermined focus as said collimated light. When the reflected light is brought to said predetermined focus, it is detected by a second photo-detector which will provide an electrical output pulse in response thereto.

The position of the microscopic objective is determined at the time of the electrical output pulse responsive to said reflected light and the distance traversed by said microscopic objective and, hence, the relative back-focus of the particular lenticule being monitored, may be readily determined.

22 Claims, 7 Drawing Figures

INVENTORS
FARAMARZ FARAMARZPOUR
and
BY    ERNEST W. LONG
Brown and Mikulka
and
Michael Bard
ATTORNEYS

RELATIVE BACK FOCUS MONITORING METHOD AND APPARATUS

BACKGROUND OF THE INVENTION

The present invention relates, generally, to optical measuring instruments and, more particularly, to means for determining the relative back-focus of a lenticule.

In general, color screen elements comprise a screen pattern formed of a plurality of light-transmitting colored elements which are each of an independent primary color and which are generally classifiable into different groups in accordance with the color thereof. Thus, a conventional three color additive screen generally has a set or group of red colored filter elements, a set of blue colored filter elements and a set of green colored filter elements. These filter elements are ordinarily in a mosaic or geometrical pattern in a random or regular distribution.

In U.S. Pat. No. 3,284,208 issued on Nov. 8, 1966 to Edwin H. Land, it was shown that photographic multicolor screen elements exhibiting a high degree of optical acuity and particularly adapted for use in additive multicolor photographic processes, both conventional and diffusion transfer types, may be expeditiously prepared, in general, by successively coating (on the smooth flat surface of a lenticular film) a plurality of photoresponsive layers. Each photoresponsive layer is subjected to exposure radiation incident on the lenticular film at angles adapted to provide exposed areas of the coating contiguous each lenticule. The unexposed areas of the coating are then removed and the exposed areas dyed to provide a series of chromatic filter elements. The incident radiation employed to effect exposure of successive photoresponsive layers is directed so as to provide formation of each series of chromatic filter elements in substantial side-by-side relationship on the smooth surface of the lenticular film.

It is readily apparent that in the manufacture of such photographic multi-color screen elements the optical properties of the lenticules comprising the lenticular layer and, more particularly, the uniformity of such properties between lenticules becomes extremely important.

One such property which must be maintained uniform between lenticules is the relative back-focus of each of said lenticules. If we consider a lenticular film as comprising a support, or web, having a lenticular layer on one surface thereof, we may define the term relative back-focus to mean the distance from the focus of a lenticule to the surface of said support or web remote from said lenticular layer. Any significant variation in the relative back-focus between each of the lenticules, comprising the lenticular layer, will adversely affect the formation of a suitable series of chromatic filter elements aforesaid.

SUMMARY OF THE INVENTION

The instant invention provides a means for sequentially determining the relative back-focus of each of the lenticules in a web-supported lenticular film. The invention accomplishes its purpose by employing, in one embodiment thereof, a collimated light source which transmits collimated light through a green filter and thence through one of said lenticules from whence it is transmitted through a microscopic objective which focuses the collimated light through a first beam splitter to a position remote from said microscopic objective. Means are provided for moving said microscopic objective toward and away from said lenticular film whereby the focus of the green-filtered light may be varied toward and away from said lenticular film in correspondence to the movement of said microscopic objective.

An aperture plate is positioned remote from said microscopic objective, symmetrically disposed about the optical axis thereof and positioned with respect thereto so that the green-filtered light may be focused in the plane thereof at some point in the movement of said microscopic objective. When the green-filtered light is so focused, it will be transmitted, through a second beam splitter, to a first photo-detector in an amount sufficient to cause said first photo-detector to emit an electrical output pulse.

A source of non-collimated light is provided which transmits light through a blue filter onto said first beam splitter from whence it is reflected through said microscopic objective onto the surface of said web remote from said lenticular layer. The blue-filtered light reaching said remote web surface is reflected therefrom back through said microscopic objective which focuses said blue-filtered light through said first beam splitter to a position remote from said microscopic objective. The blue-filtered light focused by said microscopic objective, through said first beam splitter, will be reflected by said second beam splitter to a second photo-detector. At some point in the traverse of said microscopic objective the blue-filtered light will be focused in the plane of said aperture plate and be reflected by said second beam splitter to said second photo-detector with sufficient intensity to cause said second photo-detector to emit an electrical output signal indicative thereof. Means are provided for determining the positions of the microscopic objective at the times of emission of said electrical output pulses from said photo-detectors and for comparing the positions of said microscopic objective to provide an output signal corresponding to the relative back-focus of the lenticule being monitored.

The subject invention is equally adapted for determining the distance from the focus of any lens within or without a lens structure (such as a mosaic arrangement of lenses supported by a web) to a reference.

Accordingly, it is an object of the present invention to provide a means of assuring a high degree of optical acuity in photographic multi-color screen elements.

Another object of this invention is to provide a means for assuring uniformity between the lenticules comprising a lenticular film.

A further object of the instant invention is to provide a means for determining the relative back-focus of each of a plurality of lenticules or the like.

A still further object of this invention resides in the provision of means for sequentially optically detecting the focus of each of the lenticules or the like comprised in a web-supported film, simultaneously optically detecting the surface of said web remote from said film, and determining the distance between said focus and said remote surface to effect an indication of the relative back-focus of each of said lenticules or the like.

Yet another object of the instant invention is to provide a means of assuring uniformity between the lenticules of a movable web-supported lenticular film by optically scanning such lenticules in a direction transverse to the direction of movement of said film.

Other objects and many of the attendant advantages of the present invention will be better appreciated and said invention will become clearly understood with reference to the following detailed description when considered in conjunction with the accompanying drawings illustrating two embodiments of the instant invention, wherein:

Figure 1:
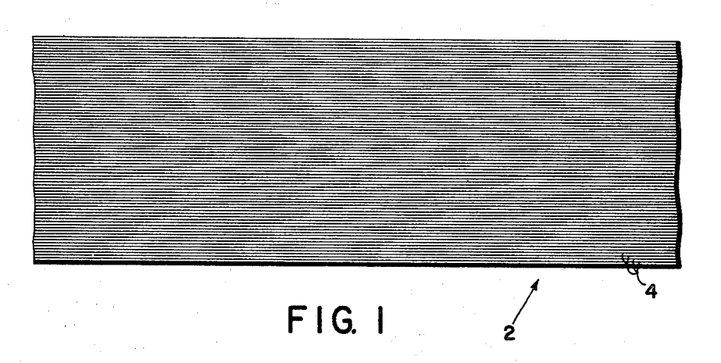
FIG. 1 provides a top plan of a portion of the lenticular film of one embodiment of the present invention.

Referring to the drawings in more detail and, more particularly, to FIG. 1, a piece of lenticular film is shown generally at 2, including a plurality of longitudinally extending lenticules 4 spaced transversely thereacross. Typically, the film 2 may contain 750 lenticules 4 per inch of width.

Figure 5:
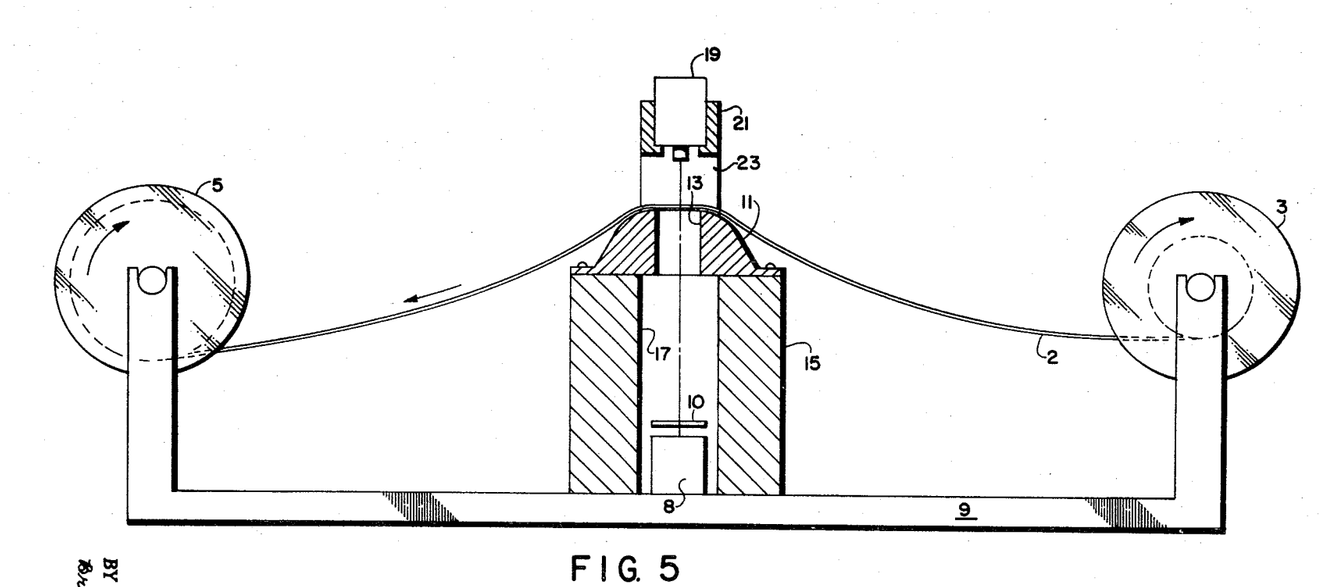
FIG. 5 provides a simplified front elevation of the embodiments of both FIGS. 3 and 4.
Figure 6:
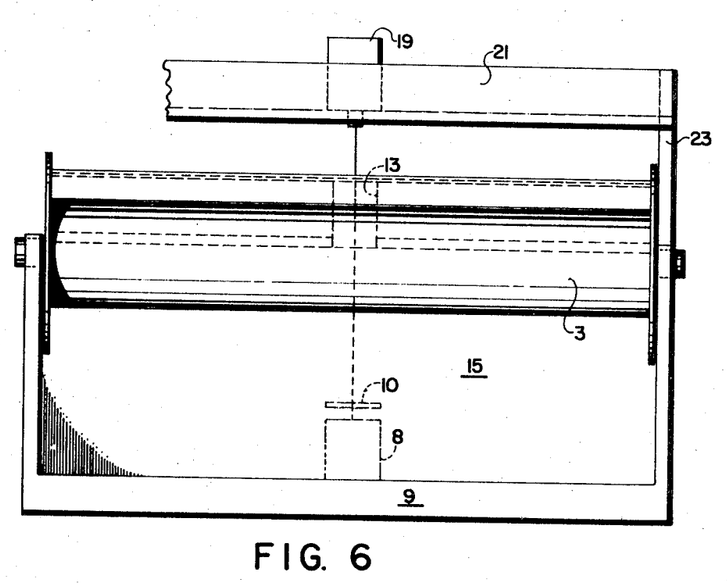
FIG. 6 provides a simplified fragmentary side elevation of the structure of FIG. 5.

Referring to FIGS. 5 and 6 in more detail, the film 2 is shown mounted on a pair of spaced rollers 3 and 5, respectively, for advancement longitudinally therebetween in the direction of the arrows. The rollers 3 and 5 are rotatably supported by a frame 9 and either or both may be driven in a well-known manner, not shown.

The film 2 is supported in its span by means of an air bearing 11 having an opening 13 centrally therethrough. The air bearing 11 is secured to the frame 9 by a support 15 having an opening 17 centrally therethrough. With the film 2 thus positioned, and moving between the rollers 3 and 5, it is desired to detect the relative back-focus of the lenticules 4 thereof to assure uniformity therebetween.

Figure 2:
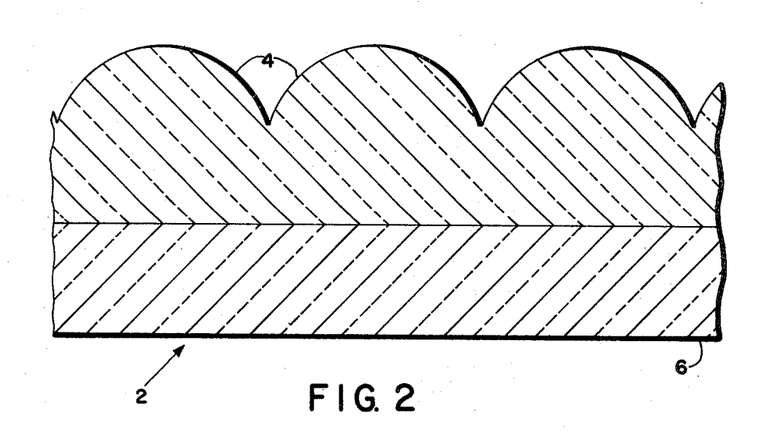
FIG. 2 provides an enlarged fragmentary cross-section of the lenticular film of FIG. 1.

Referring again to FIG. 2, the film 2 is seen to comprise a web 6 which provides a supporting base for the lenticules 4 with said web 6 and said lenticules 4 being light transmissive.

Figure 3:
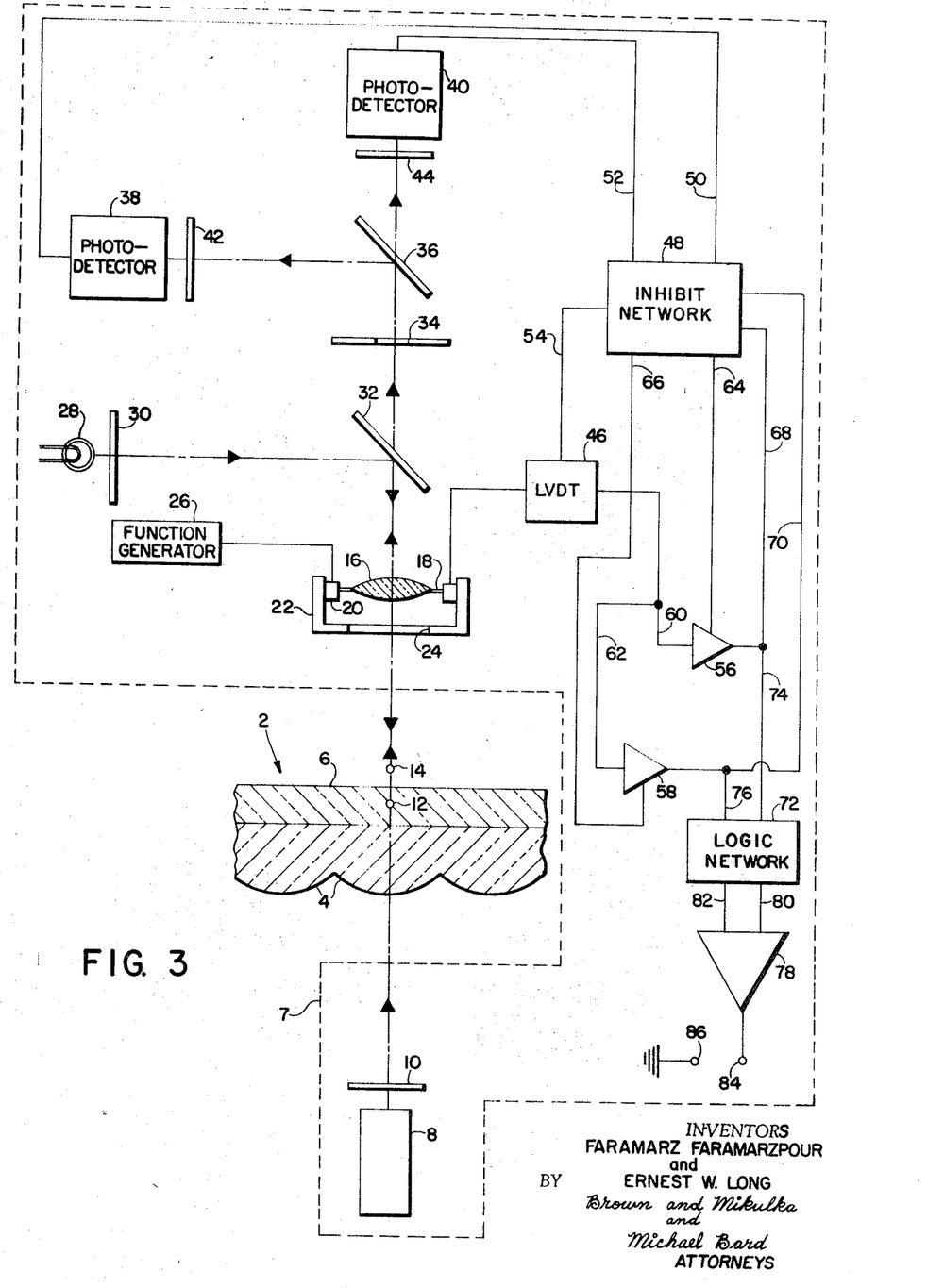
FIG. 3 provides a simplified diagrammatic representation of one embodiment of the subject invention.

Referring to FIG. 3 in more detail, one embodiment of the relative back-focus monitor comprising the present invention is shown generally at 7 together with a source of collimated light 8 disposed outwardly of the lenticulated side of a portion of the lenticular film 2, and transmitting collimated light through a green filter 10 so as to illuminate at least a preselected one of the lenticules 4 of the film 2 with green collimated light.

As best seen in FIG. 5, the collimated light source 8 and the green filter 10 are positioned on the frame 9 within the opening 17 in the support 15 whereby light from said source 8 will be able to reach the lenticulated surface of the film 2 through the opening 13 in the air bearing 11.

The relative back-focus monitor 7 is mounted within a carriage 19 in a well-known manner and the carriage 19 is movably mounted outward of the nonlenticulated surface of the film 2 on a cross-slide 21. The cross-slide 21 is, itself, mounted on a vertical support 23 which in turn is secured to the frame 9. The cross-slide 21 extends transversely of the film 2 in spaced relation thereto such that the carriage 19, together with the relative back-focus monitor 7, may slide transversely of the film 2 while maintaining a predetermined spacing with respect to the non-lenticulated surface of said film 2.

In practice, the carriage 19 and the relative back-focus monitor 7 are driven back and forth transversely of the film 2, as by a motor (not shown) so as to sequentially pass each of the lenticules illuminated by the source 8 through the filter 10.

Depending on its optical properties the illuminated lenticule 4 will focus the green collimated light to a position within or without the film 2 such as shown at 12 and 14, respectively, (FIG. 3). If the green collimated light is focused within the film 2 to a position such as the position 12, the lenticule 4 may be arbitrarily designated as exhibiting a negative relative back-focus. Conversely, where the green collimated light is focused to a position such as the position 14, without the film 2, the lenticule 4 may be arbitrarily designated as exhibiting a positive relative back-focus.

Respecting the embodiment of FIG. 3, a microscopic objective 16 is disposed, within the carriage 19, outward of the non-lenticulated side of the web 6 with its optical axis in alignment with that of the collimated light source 8. The microscopic objective 16 is secured, by a lens holder 18, to a magnet and coil assembly 20 which, in turn, is secured to a housing 22, having an aperture 24 enabling the objective 16 to see the focused image of the collimated source 8. A function generator 26, such as a common sine wave generator, is connected to the magnet and coil assembly 20, so as to supply a sinusoidal driving signal thereto and effect the sinusoidal movement of the objective 16 toward and away from the non-lenticulated surface of the web 6.

A non-collimated light source 28, such as an incandescent lamp, transmits light through a blue filter 30 to a beam splitter 32 which is positioned outward of the objective 16 and in alignment with the optical axis thereof. A portion of the blue filtered light transmitted to the beam splitter 32 is reflected therefrom and transmitted through the microscopic objective 16 and the aperture 24 onto the non-lenticulated surface of the web 6.

An aperture plate 34 is positioned outward of the beam splitter 32 in alignment with the optical axis of the objective 16 and the collimated light source 8, and a second beam splitter 36 is positioned outward of the aperture plate 34 whereby light transmitted through the beam splitter 32 and the aperture plate 34 will impinge on the beam splitter 36.

A pair of photo-detectors 38 and 40, having blue and green filters 42 and 44, respectively, are disposed with respect to the beam splitter 36 whereby the photo-detector 38 will receive any blue light reflected by the beam splitter 36 and the photo-detector 40 will receive any green light transmitted by the beam splitter 36.

A linear voltage distance transducer 46, or LVDT, is connected to the magnet and coil assembly 20 and provides an electrical output signal whose amplitude is a linear function of the displacement of the microscopic objective 16 from its initial, or neutral, position.

An inhibit network 48, the configuration of which is within the purview of ordinary skill in the art, is connected to the photo-detectors 38 and 40 via a pair of signal paths 50 and 52, respectively, and to the LVDT 46 via the signal path 54.

The output of the LVDT 46 is coupled to the input of each of a pair of sample and hold networks 56 and 58 via signal paths 60 and 62, respectively, said sample and hold networks 56 and 58 also being coupled to the inhibit network 48 to receive input signals therefrom via a pair of signal paths 64 and 66 respectively. The outputs of the sample and hold networks 56 and 58 are coupled to the inhibit network 48 via the signal paths 68 and 70, respectively, for clearing the sample and hold networks 56 and 58 at the appropriate time and in a well-known manner.

The outputs of the sample and hold networks 56 and 58 are also coupled to a logic network 72 via a pair of signal paths 74 and 76, respectively. The details of the logic network 72 will not be dealt with herein, however, said logic network 72 is of a type commonly employed in the art and serves to pass only those portions of the output signals from the sample and hold networks 56 and 58 as occur simultaneously. The logic network 72 is coupled to a difference amplifier 78, via a pair of signal paths 80 and 82, which serves to provide an output signal across a pair of output terminals 84 and 86 indicative of the output signal from the sample and hold network 58 less the output signal from the sample and hold network 56.

Before proceeding further, it should be noted that the directions of the various principal light rays appearing at different points in the relative back-focus monitor 7 (FIGS. 3 and 4) are indicated thereon by arrowheads. Also, the relative back-focus monitor 7 sequentially scans each of the lenticules 4 by moving transversely of the lenticular film 2 by means of the sliding carriage 19 (FIGS. 5 and 6).

Accordingly, where it is desired to monitor the relative back-focus of each of the lenticules while the relative back-focus monitor 7 is transversely traversing the lenticular film 2, it is necessary to provide a driving signal to the magnet and coil assembly 20 (and, hence, the microscopic objective 16) of sufficient frequency so that said objective 16 completes at least one cycle of movement for each lenticule it passes. For this purpose, it has been found most expedient to drive the microscopic objective 16 sinusoidally and, hence, the function generator 26 provides a sine wave signal 88 (FIG. 7) to the magnet and coil assembly 20.

Considering the operation of the relative back-focus monitor 7 in more detail and referring again to FIG. 3, green collimated light from the source 8 and the filter 10 is transmitted to the lenticule 4 being monitored which will bring the green collimated light to a focus such as 12 or 14, depending on the optical properties of the particular lenticule 4 being monitored. At the same time, non-collimatd blue light, from the lamp 28 and its associated blue filter 30, will be transmitted to the beam splitter 32 and a portion thereof will be reflected thereby, through the microscopic objective 16 and the aperture 24, to the non-lenticulated surface of the web 6 from whence it will be reflected.

Assume now that the relative back-focus of the particular lenticule 4 being monitored as positive. Also, it should be noted that the relative back-focus of the lenticules 4 comprising the lenticular film 2 will vary within known prescribed limits. Consider, further, that the microscopic objective 16 is initially positioned outward of the non-lenticulated surface of the web 6 a distance sufficient such that the first principal focus of the objective 16 is outward of both the non-lenticulated surface of the web 6 and the most positive focus, such as 14, of any of the lenticules 4.

When the objective 16 is in its initial, or neutral, position, it will transmit the image of the focused green light as well as the image of the blue light reflected from the non-lenticulated surface of the web 6. The microscopic objective 16 will focus the images of the blue light and the green light through a beam splitter 32 short of the aperture plate 34. The beam splitter 32, of course, will only transmit a portion of the green and the blue light focused by the microscopic objective 16. Also, since the images of the blue light and the green light are focused short of the aperture plate 34, only a small portion of said blue and said green light will be transmitted to the beam splitter 36. Said beam splitter 36 will reflect a portion of the light reaching it through the filter 42 to the photo-detector 38 and transmit a portion thereof through the filter 44 to the photo-detector 40.

Upon application of the sinusoidal driving signal 88 (and assuming it is increasing in a positive sense) to the magnet and coil assembly 20, the objective 16 will move further outward of the non-lenticulated surface of the web 6 causing the images of the blue light and the green light to be focused still further short of the aperture plate 34 with a resultant decrease in the light reaching the photo-detectors 38 and 40.

At the start of the second half cycle of the signal 88 (i.e., when it begins increasing in a negative sense) the objective 16 will begin to move closer (than its initial position) to the non-lenticulated surface of the web 6 causing the images of the blue light and the green light to approach the aperture plate 34 with an attendant increase in the illumination reaching the photo-detectors 38 and 40.

The aperture plate 34 is such that it will pass the maximum amount of blue light when the image of said blue light is focused in the plane of the aperture plate. When this occurs, the blue light transmitted by the aperture plate 34 to the beam splitter 36 and reflected therefrom, through the blue filter 42, to the photo-detector 38 will be sufficient to cause the photo-detector 38 to emit an output pulse. In a like manner, when the image of the green light is focused in the plane of the aperture plate 34, the maximum amount of green light will be transmitted, through the beam splitter 36 and the green filter 44, to the photo-detector 40 which will emit an output pulse in response thereto. The filters 42 and 44 serve to prevent their respective photo-detectors 38 and 40 from responding to the green and blue illumination, respectively.

With the relative back-focus of the lenticule 4 being monitored positive, the image of the focused green light will appear in the plane of the aperture plate 34 prior to that of the reflected blue light so that a pulse 90 (FIG. 7) will appear at the output of the photo-detector 40 prior to the appearance of a like pulse 92 (FIG. 7) at the output of the photo-detector 38. Of course, where the relative back-focus of the lenticule 4 being monitored is negative, the pulse order will be reversed.

As mentioned hereinabove, the photo-detectors 38 and 40 are connected to an inhibit network 48 via the signal paths 50 and 52, respectively. The inhibit network 48 is connected to the LVDT 46 via the signal path 54 and continually receives signals therefrom (in phase with the signal 88) indicative of the instantaneous position of the sinusoidally moving objective 16.

Figure 7:
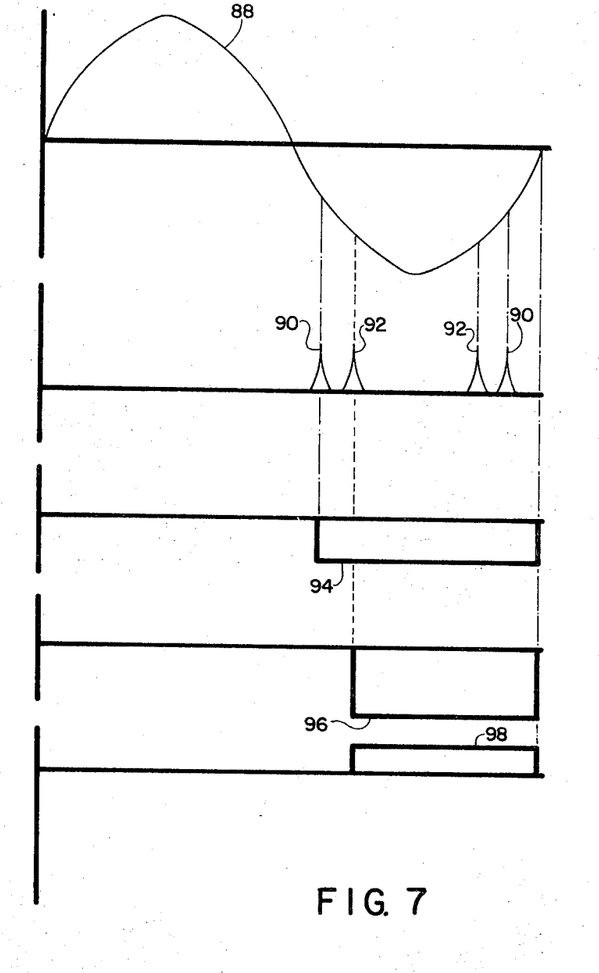
FIG. 7 provides a graphical illustration of the various electrical signals generated by the apparatus of both FIGS. 3 and 4.

The inhibit network 48 functions to pass the signals 90 and 92 received from the photo-detectors 40 and 38, respectively, which occur during a predetermined quarter of the cycle of the driving signal 88 (FIG. 7). Thus, while in the example illustrated the output pulses 90 and 92 will occur twice during one-half cycle of the sine wave signal 88 (because the microscopic objective 16 will be in the same relative position to the non-lenticulated surface of the web 6 twice during this period), only the first occurring pulses 90 and 92 will be transmitted through the inhibit network 48 to the sample and hold networks 58 and 56 respectively.

Upon receipt of the pulse 90, the sample and hold network 58 will detect the output signal from the LVDT 46 and provide a DC-level output signal 94 (FIG. 7) corresponding in amplitude to the sampled signal. In a like manner, upon receipt of the pulse 92, the sample and hold network 56 will sample the output signal from the LVDT 46 transmitted over the signal path 60 and provide a DC-level output signal 96 (FIG. 7) corresponding in amplitude to that of the sampled signal. The networks 56 and 58 will hold the DC output levels 96 and 94, respectively, until they are cleared by the inhibit network 48, via the signal paths 68 and 70, respectively. The inhibit network 48 functions to clear the sample and hold networks 56 and 58 at the end of every cycle of the sine wave signal 88 in a well-known manner.

The DC-level output signals 94 and 96 are coupled to the logic network 72 via the signal paths 76 and 74, respectively. The logic network 72 functions to delay the earlier occurring of the signals 94 and 96 (which, in the case illustrated, will be the signal 94) until the occurrence of the other of the signals 94 or 96. Thus, the two DC-levels 94 and 96, will be simultaneously fed to the difference amplifier 78 which will subtract the DC-level 96 from the DC-level 94 to yield a DC-level output signal 98 (FIG. 7) across the terminals 84 and 86.

As best seen in FIG. 7, for the case of a positive relative back-focus (and considering movement of the objective 16 toward the web 6 to be negative) the focus 14 will be detected before the non-lenticulated surface of the web 6 and, hence, the pulse 90 will precede the pulse 92 and the level of the signal 94 will be less negative than that of the signal 96 resulting in a positive signal 98 equal in magnitude to the difference between the signals 94 and 96 and, hence, equal to the relative back-focus of the particular lenticule being monitored. In the case of a negative relative back-focus, the order of occurrence of the pulses 90 and 92, and 94 and 96 (as well as the sign of the output signal 98) will be reversed.

In all of the foregoing, it was assumed that movement of the microscopic objective 16 an amount sufficient to change the particular image focused in the plane of the aperture plate 34, from that of the green light to that of the blue light (or vice versa), would correspond to the distance from the focus of the lenticule being monitored to said non-lenticulated surface of the web 6. However, such an assumption is strictly valid only where the distance from the microscopic objective 16 to the aperture plate 34 remains fixed.

In the embodiment of FIG. 3, the distance between the aperture plate 34 and the objective 16 changes as the objective 16 approaches said non-lenticulated surface. To compensate for the lack of fixed distance between said aperture plate 34 and the objective 16, the image distance of the objective 16 must be made very long with respect to the distance between said objective 16 and said non-lenticulated surface.

Typically, an objective 16 of sufficiently short focal length is chosen and the image distance, between the initial position thereof and the aperture plate 34, is made on the order of 9 or 10 inches, while the distance from the non-lenticulated surface of the web 6 to the objective 16 (when in its initial position) is on the order of 1 millimeter.

Figure 4:
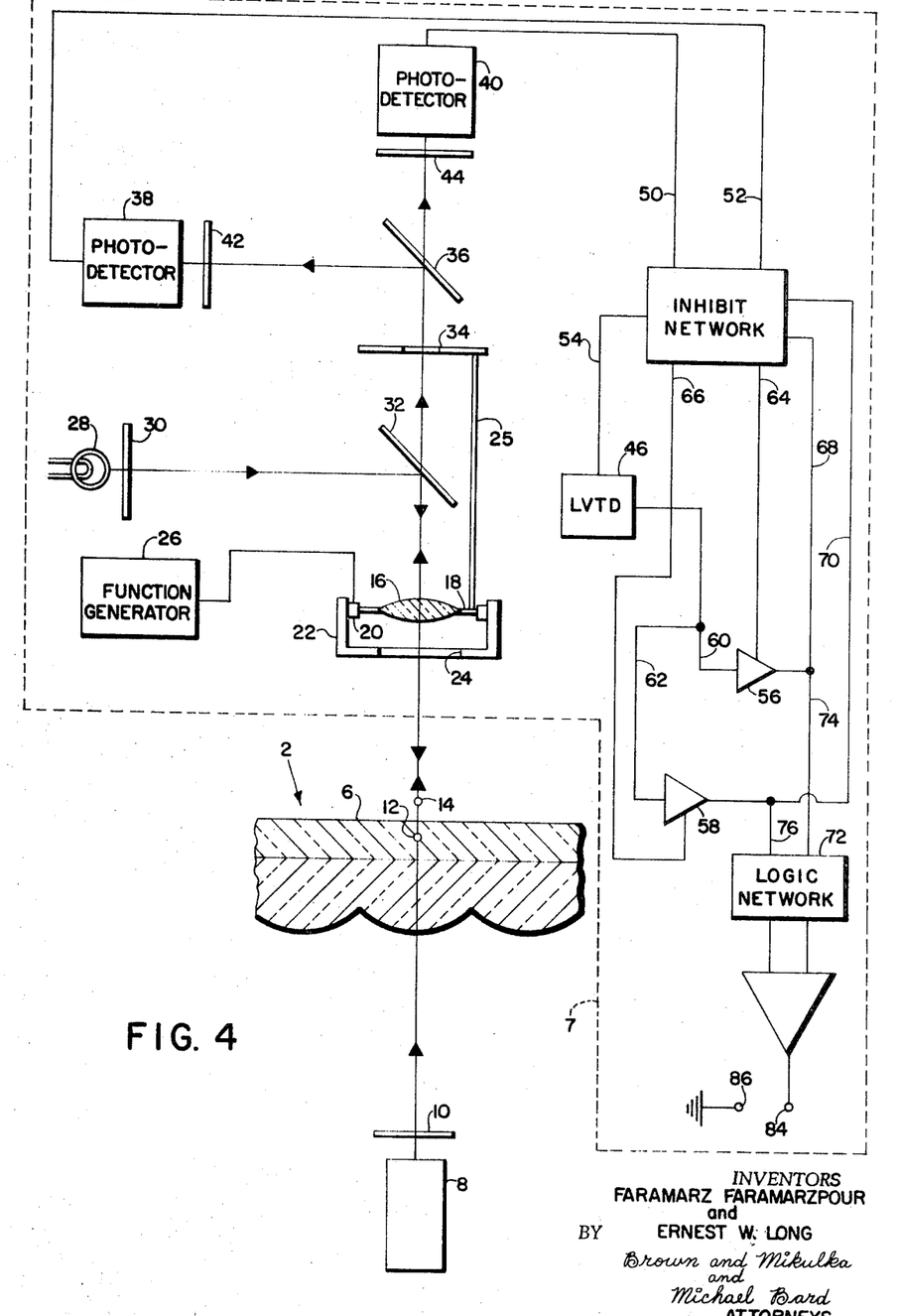
FIG. 4 provides a simplified diagrammatic representation of another embodiment of the subject invention.

In the embodiment of FIG. 4, the same components are interconnected in the same manner, both electrically and mechanically, with the exception that the aperture plate 34 is secured to the microscopic objective 16, for movement therewith, via a support 25 connected between said lens holder 18 and said aperture plate 34 to secure the latter in fixed spaced relation with respect to said microscopic objective 16. Accordingly, the same identification markings and symbols are common with respect to FIGS. 3 and 4, where appropriate.

Inasmuch as the spacing between the aperture plate 34 and the microscopic objective 16 is fixed (in the embodiment of FIG. 4), the movement of said microscopic objective 16, an amount sufficient to change the particular image focused in the plane of said aperture plate 34, corresponds to the distance from the focus of the lenticule being monitored to said non-lenticulated surface of the web 6.

Unfortunately, in the embodiment of FIG. 4, the mass which must be cyclically moved by the magnet and coil assembly 20 is significantly increased and effectively limits the driving frequency of said assembly 20. Accordingly, where the lenticular film 2 is being transversely traversed at a rapid rate (by means of the carriage 19 moving along the cross-slide 21) it may be more expedient to resort to the embodiment of FIG. 3.

Alternately, the microscopic objective 16 and the aperture plate 34 (of both the FIG. 3 and 4 embodiments) may both be stationary and secured in spaced relation. In such a situation, the advantages present in the FIG. 4 embodiment can be realized by moving the film 2 with respect to the microscopic objective 16 and aperture plate 34. This may be accomplished by mounting the air bearing 11 (FIGS. 5 and 6) on a magnet and coil assembly (not shown) for cyclical vertical movement toward and away from the objective 16 and aperture plate 34.

Another inaccuracy (this one common to the embodiments of both FIGS. 3 and 4) comes into play where the relative back-focus of the particular lenticule 4 being monitored is negative. In such a situation, the focus of the lenticule 4 being monitored will lie inside the web 6 such as at 12 (FIGS. 3 and 4). Such a focus 12 will appear to the microscopic objective 16 as being closer than it actually is due to the change in the index of refraction in passing from the film 2 to the air beyond. While in many applications of error introduced by this change in the index of refraction may be so small as to be tolerable, situations may arise wherein such will not be the case. In such an event, however, a suitable correction can be made by multiplying the output signal 94 from the sample and hold network 58 by a constant, as by appropriate circuitry common to the art.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims, the instant invention may be practised in a manner otherwise than is specifically described herein.

What is claimed is:

1. Apparatus for monitoring a plurality of serially arranged lenticulations, including:
    a source of light for illuminating each of said lenticulations and being focused thereby;
    lens means having an optical axis and spaced therealong from said lenticulations and a reference for sequentially imaging the focus of said light by each of said lenticulations to positions along said optical axis;
    means for cyclically varying the distance between said lens means and such lenticulations during said imaging;
    photoresponsive means for detecting the imaged foci of said light by said lenticulations and for generating a signal in response thereto; and
    means responsive to said signal for determining the distances between said reference and the foci of said lenticulations.

2. Apparatus for monitoring a plurality of lenticules or the like, including:
    a source of light for illuminating each of said lenticules or the like and being focused thereby
    means for detecting the focus of light by each of said lenticules or the like, including lens means having an optical axis disposed in cyclically variable spaced relation along said optical axis with respect to a reference; and
    means for detecting and comparing the relative positions along said optical axis of said lens means and said reference and determining the distance therebetween in response to each sequentially detected focus to thereby determine the distance between each said focus and said reference.

3. The invention as related in claim 2, wherein said reference is at least partially reflective to at least one wavelength of light and further including a second source of light for illuminating said reference whereby light will be reflected from said reference; said lens means being adapted to receive at least a portion of the light reflected from said reference to form an image thereof at a first focus and sequentially so positioned with respect to each of said lenticules or the like so as to form an image of the light focused by each lenticule or the like thereby at a second focus; whereby movement of said lens means along said optical axis will alternately effect the movement of said first and second foci to a preselected position.

4. The invention of claim 3, further including first detecting means for detecting coincidence between said first focus and said preselected position and second detecting means for determining coincidence between said second focus and said preselected position.

5. The invention of claim 4, wherein said detecting and comparing means includes means connected to said lens means and to said first and second detecting means for determining the position of said lens means upon effecting coincidence between said first focus and said preselected position and between said second focus and said preselected position; and means for detecting the distance between the positions of said lens means so determined.

6. The invention as recited in claim 5, further including means positioned with respect to said lens means so as to pass to said first and second detecting means a portion of the light focused by said lens means; said transmitted portion being a maximum with respect to the image of said reference when said second focus is coincident with said preselected position and with respect to the image of said scanned lenticule or the like when said first focus is coincident with said preselected position.

7. The invention as related in claim 6, wherein said means for transmitting a portion of the light focused by said lens means comprises an aperture plate disposed transversely the optical axis of said lens means and located at said preselected position.

8. The invention as set forth in claim 7, wherein said first-mentioned source of light provides collimated light of one wavelength and said second source of light provides non-collimated light of a different wavelength.

9. The invention as set forth in claim 8, additionally including:
    means for receiving light from said second source of light and reflecting at least a portion thereof through said lens means to said reference and for receiving light focused by said lens means and transmitting at least a portion thereof through said aperture plate; and
    means for receiving light transmitted through said aperture plate and reflecting a portion thereof to one of said first and second detectors and transmitting a portion thereof to the other of said first and second detectors.

10. The invention described in claim 9, additionally including means for transmitting light of only one of said wavelengths to one of said first and second detectors and for transmitting only light of the other of said wavelengths to the other of said first and second detectors.

11. In combination with a film comprising a plurality of lenticules or the like disposed along one surface of a supporting web, apparatus for detecting the relative back-focus of at least a preselected one of said lenticules or the like, including:
    means for transmitting light of one wavelength through said preselected lenticule or the like;

a lens suitably positioned with respect to the surface of the web opposite said film for focusing said transmitted light and movable toward and away from said web so as to vary the focus of the image received from said lenticule or the like;

means for detecting said image when it is focused at a predetermined plane;

means for determining the position of said lens when said image is focused at said predetermined plane;

a source of light of a wavelength different from that of said first-mentioned source for transmitting light through said lens to one surface of said web such that light is reflected therefrom and brought to a variable focus by said lens;

means for detecting said reflected light when it is focused at said predetermined plane by said lens;

means for determining the position of said lens when said reflected light is focused at said predetermined plane; and means for comparing the position of said lens when said light of one wavelength is focused at said predetermined plane with that of said lens when said light of said different wavelength is focused at said predetermined plane and determining the relative back-focus of said lenticule or the like therefrom.

12. The invention of claim 11, further including means for detecting only the light of said one wavelength when it is focused at said predetermined plane and means for detecting only light of said different wavelength when it is focused at said predetermined plane.

13. The invention as set forth in claim 12, wherein said position determining means includes means connected to said lens for continually monitoring the position thereof; and means connected to said detecting means and said monitoring means for sampling the output of said monitoring means in response to actuation of each of said detecting means.

14. The invention as stated in claim 13, wherein said monitoring means comprises a linear voltage/distance transducer and said sampling means comprises a pair of sample and hold networks each connected to said linear voltage/distance transducer and responsive to the actuation of one of said detecting means so as to sample the output of said linear voltage/distance transducer in response to such actuation and provide a DC-level output signal indicative of the position of said lens.

15. The invention as set forth in claim 14, additionally including means for sinusoidally driving said lens toward and away from the non-lenticulated surface of said web;

means connected to said sample and hold networks for passing only such portions of their respective outputs as are temporarily coincident; and means for determining the difference between said temporarily coincident outputs and providing an output signal indicative of the relative back-focus of said preselected lenticule or the like.

16. Apparatus for determining the relative back-focus of the lenticules or the like comprising a layer mounted on one surface of a supporting web the other surface of which is at least partially reflective to light, including:

a source of illumination of a first wavelength suitably disposed for illuminating at least a preselected one of the lenticules or the like with light which is focused by at least one of said lenticules or the like to form an image of said source;

a lens positioned with respect to said web for receiving the image of said source and bringing it to a predetermined focus;

means connected to said lens for cyclically moving said lens toward and away from said web;

means connected to said lens for continually monitoring the position of said lens and providing an output signal linearly responsive thereto;

a source of light of a second wavelength;

a first beam splitter for reflecting light of said second wavelength through said lens to the non-layered surface of said web from whence it is reflected back to said lens which will bring the image of said second source to said predetermined focus at some point in its movement with respect to said web;

said first beam splitter serving to pass at least a portion of the light of said first wavelength and said second wavelength focused by said lens;

an aperture plate positioned at said predetermined focus and serving to pass a portion of said light of said first wavelength and said second wavelength which is focused thereat;

a second beam splitter for reflecting a portion of the light focused at said aperture plate in one direction and transmitting a portion of said light focused at said aperture plate in another direction;

a first photo-detector for receiving a portion of said illumination reflected by said second beam splitter which is of one of said first and second wavelengths and providing an output signal when light of its received wavelength is focused by said lens at said predetermined focus;

a second photo-detector for receiving a portion of said light transmitted by said second beam splitter corresponding to the other of said first and second wavelengths and providing an output signal when light of the other of said first and second wavelengths is focused by said lens at said predetermined focus; and means connected to said monitoring means for comparing the output signals therefrom at the times of the respective output signals from said first and second photo-detectors and generating a signal corresponding to the distance between the focus of said preselected lenticule or the like and the non-lenticulated surface of said web.

17. A method for sequentially measuring the distance between the focus of each of plural serially arranged lenticules or the like and a predetermined reference comprising the steps of:

illuminating each said lenticule or the like with light such that said light will be brought to a first focus by said lenticule or the like;

sequentially imaging each such first focus to a predetermined second focus by cyclically moving a lens toward and away from each said lenticule or the like in turn;

determining the position of said lens when each said first focus is imaged at said predetermined second focus;

illuminating said reference and reflecting light therefrom;

cyclically moving said lens with respect to said lenticule or the like and said reference so as to bring said reflected light to said predetermined second focus;

determining the position of said lens when said reflected light is brought to said predetermined second focus; and sequentially determining the change in position of said lens in imaging each said first focus to said predetermined second focus and in bringing said reflected light to said predetermined second focus.

18. The method of claim 17, wherein said lenticule or the like is illuminated with light of one wavelength and where light of another wavelength is reflected from said reference.

19. Apparatus for monitoring a plurality of optical focusing means, including:

a source of light for illuminating each of said focusing means and being focused thereby;

leans means having an optical axis and disposed in cyclically variable spaced relation with respect to a reference along said axis for sequentially scanning said plurality of focusing means and sequentially imaging the focus of said light by each said focusing means to a predetermined position;

first photoresponsive means for detecting the presence of each said image at said predetermined position;

means for illuminating said reference and imaging same at said predetermined position;

second photoresponsive means for detecting the presence of said image of said reference at said predetermined position; and means for comparing the relative positions of said lens means and said reference and determining the distance therebetween in response to signals from said first and second photoresponsive means, respectively, to thereby determine the distance between the focus of said light of each said optical focusing means and said reference.

20. The invention as described in claim 19, wherein each said focusing means is illuminated with light of one wavelength and light of a different wavelength is reflected from said reference; and further including means for allowing light of only one of said wavelengths to reach a predetermined one of said photoresponsive means and only light of the other of said wavelengths to reach the other of said photoresponsive means.

21. The invention as recited in claim 20, further including means positioned with respect to said lens means so as to transmit to said first and second photoresponsive means a portion of the light focused by said lens means; said transmitted portion being a maximum with respect to the image of said reference when the focus of said reference image is coincident with said predetermined position and with respect to the image of the focus of each focusing means when each said focusing means' image is coincident with said predetermined position.

22. The invention as described in claim 1, further including means positioned with respect to said lens means so as to transmit to said photoresponsive means a portion of the light imaged by said lens means; said portion being a maximum when said imaged light is focused at a predetermined position.

* * * * *